United States Patent
Segalman et al.

[11] Patent Number: 5,957,016
[45] Date of Patent: Sep. 28, 1999

[54] METHOD AND APPARATUS FOR SUPPRESSING REGENERATIVE INSTABILITY AND RELATED CHATTER IN MACHINE TOOLS

[75] Inventors: Daniel J. Segalman; James M. Redmond, both of Albuquerque, N.Mex.

[73] Assignee: Sandia Corporation, Albuquerque, N.Mex.

[21] Appl. No.: 08/835,977

[22] Filed: Apr. 11, 1997

Related U.S. Application Data

[60] Provisional application No. 60/015,109, Apr. 10, 1996.

[51] Int. Cl.$^6$ ................................................ B23B 3/00
[52] U.S. Cl. ................................. 82/1.11; 409/141
[58] Field of Search .......................... 82/1.11, 158, 904; 409/131, 132, 141; 408/143

[56] References Cited

U.S. PATENT DOCUMENTS

| | | | |
|---|---|---|---|
| 3,744,353 | 7/1973 | Robs | 82/2 R |
| 3,800,380 | 4/1974 | Cline et al. | 408/144 |
| 3,967,515 | 7/1976 | Nachtigal | 82/2 B |
| 4,193,724 | 3/1980 | Morse | 409/141 |
| 4,604,834 | 8/1986 | Thompson | 409/141 |
| 4,605,386 | 8/1986 | Harris | 474/8 |
| 4,617,503 | 10/1986 | Davis et al. | 318/572 |
| 4,742,998 | 5/1988 | Schubert | 267/136 |
| 4,986,150 | 1/1991 | Okazaki | 82/158 |
| 5,029,677 | 7/1991 | Mitsui | 188/267 |
| 5,033,340 | 7/1991 | Siefring | 82/158 |
| 5,095,786 | 3/1992 | Bellinghausen | 82/112 |
| 5,102,237 | 4/1992 | Ide | 384/224 |
| 5,170,358 | 12/1992 | Delio | 364/474.19 |
| 5,604,413 | 2/1997 | Khorrami et al. | 318/632 |

OTHER PUBLICATIONS

Daniel J. Segalman, Gordon G. Parker and Daniel J. Inman, "Vibration Suppression by Modulation of Elastic Modulus using Shape Memory Alloy," *Intelligent Structures, Materials and Vibrations,* DE–vol. 58, pp. 1–5, ASME 1993.

Dimitris C. Lagoudas and Iradj G. Tadjbakhsh, "Active flexible rods with embedded SMA fibers," *Smart Mater, Struct. 1,* pp. 162–167, 1992.

K. Nagaya, S. Takeda, Y. Tsukui and T. Kumaido, "Active Control Method for Passing through Critical Speeds of Rotating Shafts by Changing Stiffnesses of the Supports with Use of Memory Metals," *Journal of Sound and Vibration,* pp. 307–315, 1987.

C. L. Nachtigal and N. H. Cook "Active Control of Machine–Tool Chatter," *Transactions of the ASME,* pp. 238–244, Jun. 1970.

(List continued on next page.)

*Primary Examiner*—Andrea L. Pitts
*Assistant Examiner*—Adesh Bhargava
*Attorney, Agent, or Firm*—V. Gerald Grafe; Andrew Abeyta

[57] ABSTRACT

Methods of and apparatuses for mitigating chatter vibrations in machine tools or components thereof. Chatter therein is suppressed by periodically or continuously varying the stiffness of the cutting tool (or some component of the cutting tool), and hence the resonant frequency of the cutting tool (or some component thereof). The varying of resonant frequency of the cutting tool can be accomplished by modulating the stiffness of the cutting tool, the cutting tool holder, or any other component of the support for the cutting tool. By periodically altering the impedance of the cutting tool assembly, chatter is mitigated. In one embodiment, a cyclic electric (or magnetic) field is applied to the spindle quill which contains an electro-rheological (or magneto-rheological) fluid. The variable yield stress in the fluid affects the coupling of the spindle to the machine tool structure, changing the natural frequency of oscillation. Altering the modal characteristics in this fashion disrupts the modulation of current tool vibrations with previous tool vibrations recorded on the workpiece surface.

18 Claims, 8 Drawing Sheets

OTHER PUBLICATIONS

K. Srinivasan and C. L. Nachtigal, "Analysis and Design of Machine Tool Chatter Control Systems Using the Regeneration Spectrum," *Journal of Dynamic Systems, Measurement, and Control,* vol. 100, Sep., 1978.

B. R. MacManus, "A Closed Loop Stabilization Technique Eliminating Machine Tool Chatter" *Int. J. Mach. Tool Des. Res,* vol. 9, pp., 197–214, Pergamon Press 1969.

T. R. Comstock, F. S. Tse and J. R. Lemon, "Application of Controlled Mechanical Impedance for Reducing Machine Tool Vibrations," *Journal of Engineering for Industry,* pp. 1057–1062, Nov. 1969.

K. Jemielniak and A. Widota, "Suppression of Self–Excited Vibration by the Spindle Speed Variation Method," *Suppression of Self–exited Vibration,* pp. 207–214, Jan. 1984.

S. C. Lint and M. R. Hu, "Low Vibration Control System in Turning," *Int. J. Mach. Tools Manu.,* vol. 32, No. 5, pp. 629–640, 1992.

T. L. Subramanian, M. F. DeVries and S. M. Wu, "An Investigation of Computer Control of Machining Chatter," *Journal of Engineering for Industry,* pp. 1209–1214, Nov. 1976.

METHOD AND APPARATUS FOR SUPPRESSING REGENERATIVE INSTABILITY AND RELATED CHATTER IN MACHINE TOOLS

CROSS-REFERENCE TO RELATED APPLICATIONS

This application claim the benefit of U.S. Provisional Application No. 60/015,109, filed Apr. 10, 1996.

GOVERNMENT RIGHTS

This invention was made with United Stats Government support under Contract No. DE-AC04-94AL85000 awarded by the U.S. Department of Energy. The Government has certain rights in this invention.

BACKGROUND OF THE INVENTION

The present invention relates generally to the field of machine tools. More specifically, the present invention relates generally to methods of and apparatuses for suppressing or preventing chatter in a machine tool assembly by modulating the mechanical impedance (time-varying impedance) of a component of the machine tool assembly.

Figure 1:
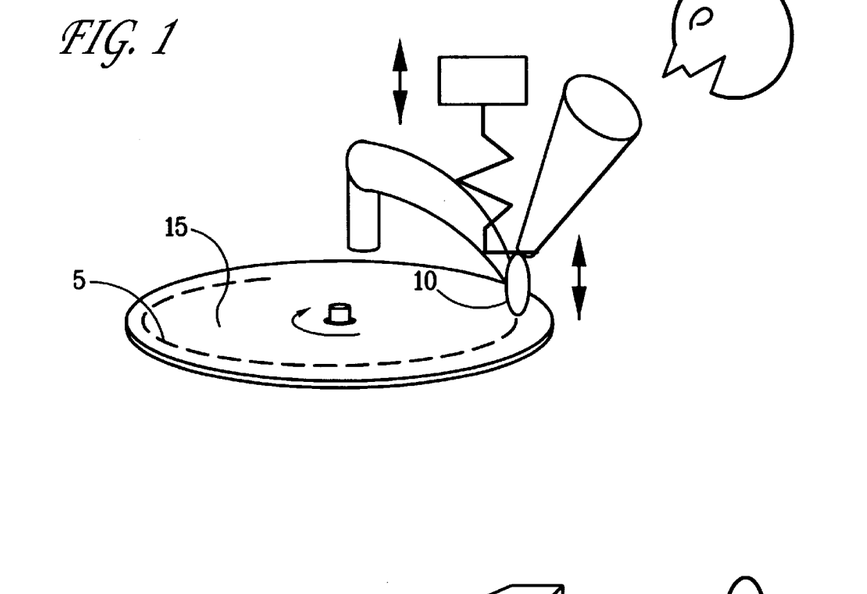
FIG. 1 is a perspective view of a Edison-type phonograph system for use as an analogy in understanding the present invention.
Figure 1A:
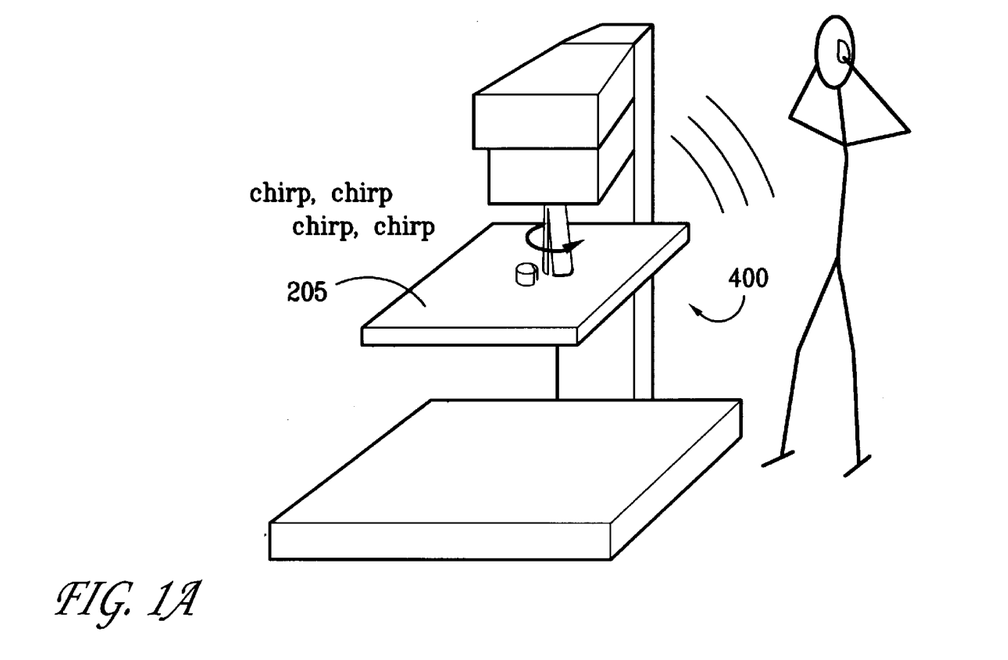
FIG. 1A is a perspective view of an exemplary machine tool assembly.

The literature discussing regenerative chatter associated with metal cutting is extensive. Chatter is a regenerative instability associated with the playback of irregularities on the workpiece (machined part) from previous cuts to the machine (cutting) tool. FIG. 1A is a representative depiction of the chatter associated with machine tool assembly 400 and operation thereof, which, as illustrated, can be an undesirable nuisance to one's ears. Encountered in many types of metal removal processes, chatter is a dangerous condition that results from the interaction of the cutting dynamics with the modal characteristics of the machine-workpiece assembly. Machine tool vibrations are recorded on the surface of the workpiece during metal removal, imposing a waviness that alters the chip thickness during subsequent cutting passes. Deviations from the nominal chip thickness effect changes in the cutting force which, under certain conditions, can further excite vibrations. The costs of chatter include the variability of end product, waste of parts, tool breakage or wear, and reduced production.

Figure 2:
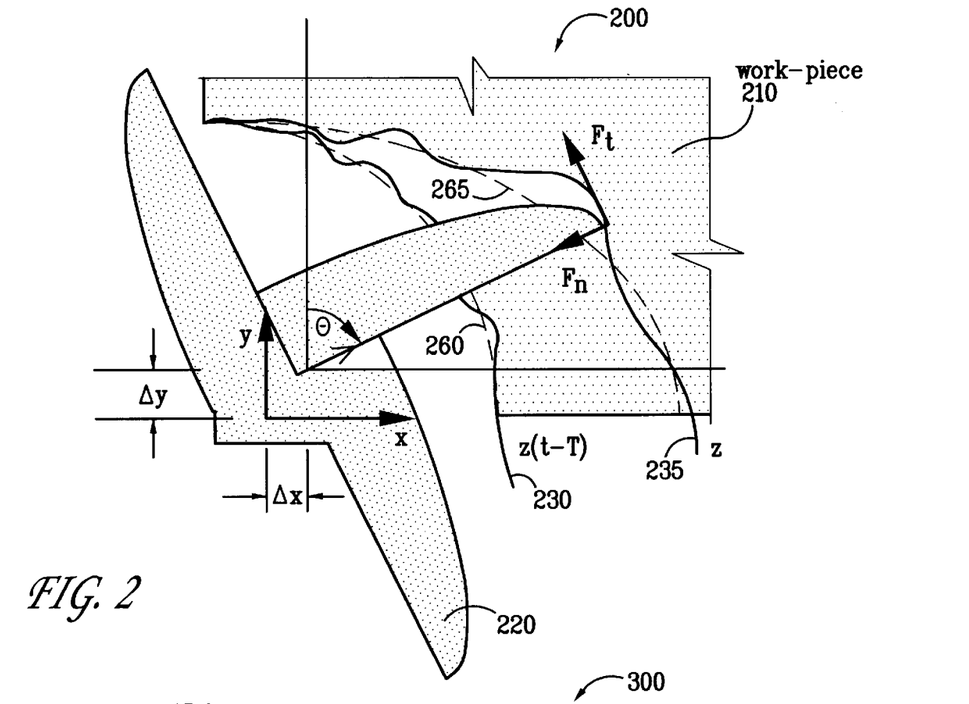
FIG. 2 is a diagram of the kinematics of the cutting process illustrating the manner in which surface texture due to tool oscillation on previous cuts contributes to the forces on the machine (cutting) tool.

The mechanical process appears to be well understood. (See, e.g., H. E. Merritt , "Theory of Self-Excited Machine Tool Chatter", *Journal of Engineering for Industry* , Vol. 87, pp. 447–453, November 1965; R. A. Thompson, "On the Doubly Regenerative Stability of a Grinder: The Theory of Chatter Growth ", *Journal of Engineering for Industry* , Vol. 108 , pp. 75–82 May 1986 ; and J. Tlusty and F. Ismail, "Special Aspects of chatter in Milling", *Journal of Vibration, Acoustics, Stress, and Reliability in Design* Vol. 105, pp. 24–32, May 1986.) The physics of the problem can be understood qualitatively through analogy with the old Edison wax phonographs as depicted in FIG. 1; 85 the playing and recording of a wax phonograph record 15 is analogous to the machine tool chatter process. Referring to FIG. 1, as the track moves under the needle 10, undulations within the groove 5 (dotted line) excite vibration in a speaker and sound is conveyed into the air. Similarly, sounds in the air are conveyed through the speaker and needle 10 into the wax of the record 15. Any mechanical oscillations (resonances) in the mechanical system will also be recorded on the record 15. If mechanical resonances are inadvertently recorded, then playback of the record 15 could further excite those resonances and the large signal will be re-recorded into the wax. This regenerative process is referred to as chatter. An illustration of this effect in milling is shown in FIG. 2. The kinematics of the cutting process 200 illustrates the manner in which surface texture due to tool oscillations on previous cuts contributes to the forces on the cutting tool 410. Oscillation or vibration of cutting tool 410 imposes a waviness (represented by lines 230 and 235) on the surface of workpiece 210 during each pass of the cutting tooth 220. (The ideal cut is represented by dotted lines 260 and 265.) The waviness (lines 230 and 235) imposed then excites tool vibration during the subsequent tool pass by altering the nominal chip thickness and the resultant cutting forces. Surface waviness can further excite vibrations by altering the instantaneous chip thickness, h (where $h=h_{nominal}+z(t)-z(t-T)$ (see FIG. 2). The stability of cutting conditions depends on the interaction of the current and past vibrations.

Figure 3:
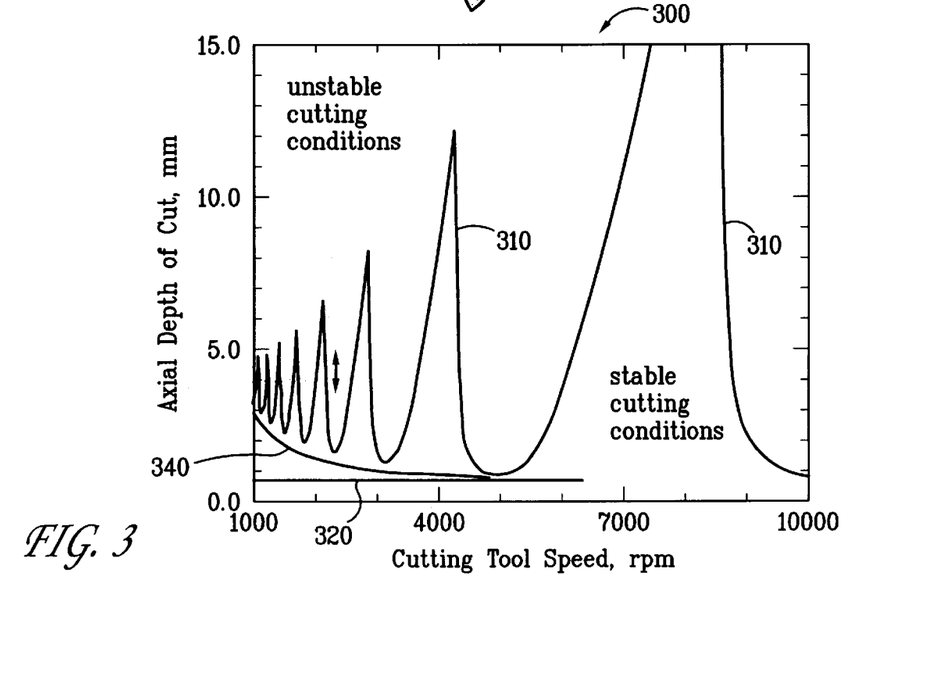
FIG. 3 is a graph of a nominal stability chart illustrating stable and unstable cutting condition regions as a function of the cutting tool spindle speed (rpm) and axial depth-of-cut.

Additionally, chatter avoidance and suppression have been extensively considered. (See, e.g., S. K. Choudhury and M. S. Sharath, "On Line Control of Machine Tool Vibration During Turning Operation," *Journal of Material Processing Technology* , Vol. 47, pp. 251–259, 1995; S. Smith and T. Delio, "Sensor Based Chatter Detection and Avoidance by Spindle Speed Selection", *Journal of Dynamic Systems, Measurement, and Control*, Vol. 114, pp. 486– 492, 1992; and S. G. Tewani, B. L. Walcott, and K. E. Rouch, "Cutting Process Stability of A Boring Bar with Active Dynamic Absorber", *Proceedings of the* 13*th Biennial Conference on Mechanical Vibration and Noise*, DE Vol. 37 , pp. 205–213, 1991.) The primary approaches are suggested by the classical stability chart for turning processes, which is defined by the dynamic stiffness of the cutting tool. A nominal stability chart 300 is shown in FIG. 3, which displays a cutting stability boundary (represented by curve 310) as a function of the cutting-tool spindle speed (rpm) and axial depth-of-cut (mm). In FIG. 3, all cutting processes that fall below curve 310 represent stable cutting conditions. Conversely, all cutting processes that fall above the curve 310 represent unstable cutting conditions (regenerative chatter). Several techniques have been explored in the past for maintaining cutting stability including:

(1) Small depth-of-cut. Taking such shallow cuts that the process stays within the stability domain (see FIG. 3) regardless of cutting speed;

(2) Speed selection. Adjusting the depth-of-cut for a particular cutting speed to stay below envelope of stability curve 310;

(3) Low tool speed. Adjusting the speed to remain within stability lobes for a given depth of cut (the CRACK method is a version of this technique (See S. Smith and T. Delio, "Sensor Based Chatter Detection and Avoidance by Spindle Speed Selection", *Journal of Dynamic Systems, Measurement, and Control*, Vol. 114, pp. 486–492, 1992.)); and (4) High Stiffness/Damping. Maximizing the dynamic stiffness of the cutting machine and the part support through design, which results in raising the stability curve in the "depth-of-cut" direction and increasing the number of stable process conditions.

Another method, not suggested by nominal stability chart 300 of FIG. 3, is that of perturbing the cutting speed about the nominal speed to disrupt the modulation of current and previous tool vibrations that can lead to chatter. (See K. Jemelniak and A. Widota, "Suppression of Self-Excited Vibration by Spindle Speed Variation Method", *International Journal of Machine Tool Design and Research"*, Vol.

24, No.3, pp. 207–214, 1984.) This process can be summarized by a horizontal line segment 320 on nominal stability chart 300, with the cutting speed moving cyclically from side to side.

BRIEF SUMMARY OF THE INVENTION

The present invention comprises a method for controlling chatter in a machine tool assembly during a machining operation, the machine tool assembly having a plurality of components, the plurality of components having a mechanical impedance, the method involving the step of modulating the mechanical impedance of at least one of the plurality of components. The plurality of components include a cutting tool, a machine tool support, a workpiece, or any component of the machine tool assembly. The present invention also comprises an apparatus for controlling chatter in the machine tool assembly during a machining operation. In the apparatus, the machine tool support is adapted to receive a cutting tool, the machine tool support has a resonant frequency; and the apparatus also includes means for modulating the resonant frequency of the machine tool support and/or the cutting tool. The machine tool support is specially adapted to contain a means for modulating the resonant frequency of the machine tool assembly. Chatter therein is suppressed by periodically or continuously varying the stiffness of the machine tool (or some component of the machine tool), and hence, the resonant frequency of the cutting tool (or some component thereof). Results from a simulated milling process reveal that significant reductions in vibration amplitude can be achieved through proper selection of varying means and excitation frequency.

The novel features of the present invention will become apparent to those of skill in the art upon examination of the following detailed description of the invention or can be learned by practice of the present invention. It should be understood, however, that the detailed description of the invention and the specific examples presented, while indicating certain non-limiting embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

Figure 4:
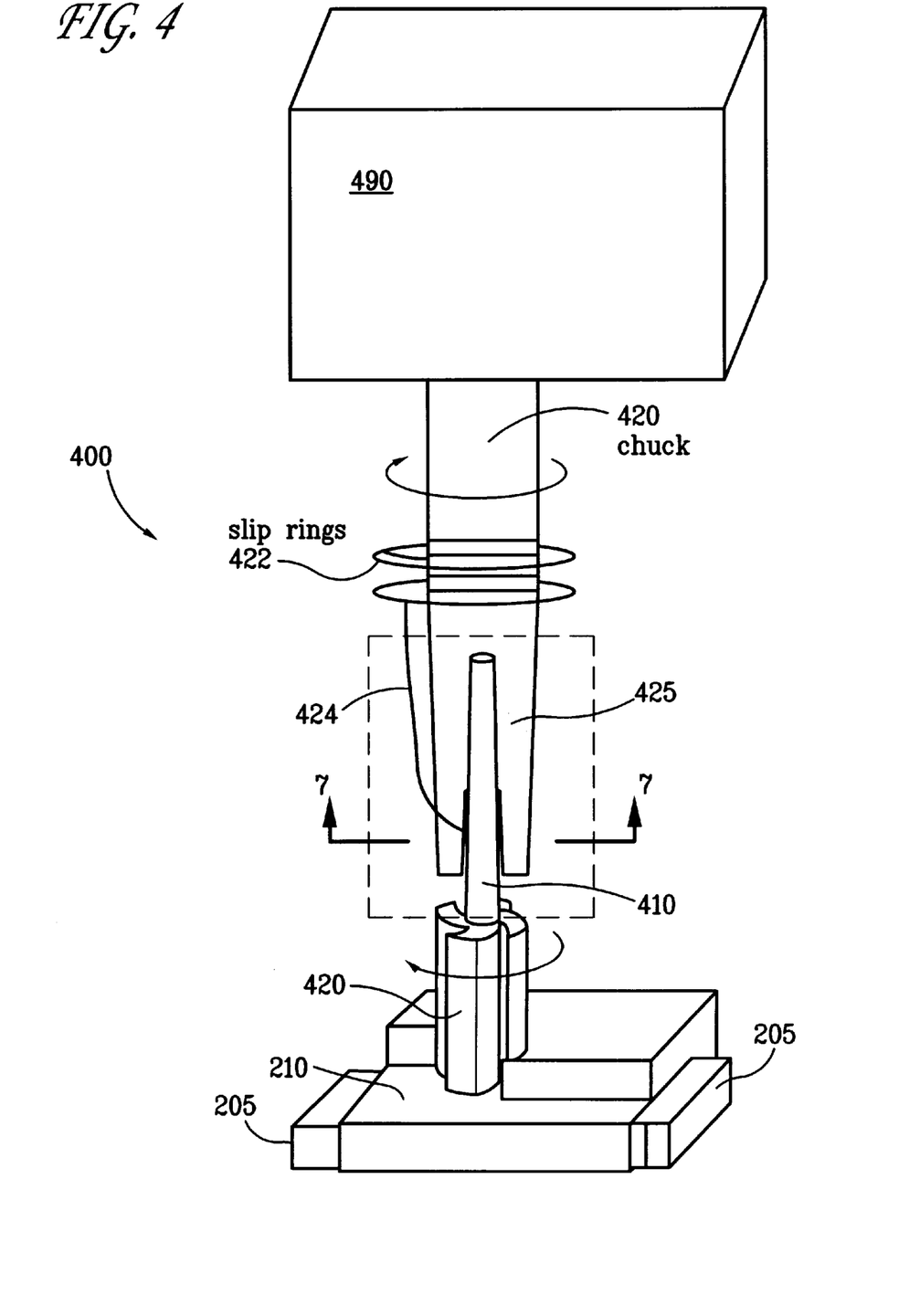
FIG. 4 is a perspective view of an embodiment in accordance with the present invention in which an electric field is applied.

Referring to FIG. 4, the present invention controls or suppresses the occurrence of chatter in a machine tool assembly 400 by modulating the mechanical impedance (time-varying impedance) of a component of machine tool assembly 400 during the machining process. The component can be either a cutting tool 410, any portion of a machine tool support (spindle) 420, which holds cutting tool 410, workpiece 220 (machined part), a workpiece support 205, or any component of machine tool assembly 400 that is mechanically connected to the assembly 400. For convenience in introducing the invention only, however, the discussion of the present invention will utilize cutting tool 410 as the subject to be modulated. In the art, and as used herein, spindle assembly is understood to include the spindle (machine tool support 420) and the chuck 425, which can be provided as either as one component or as two or more components. Additionally, although the present invention is demonstrated herein using cutting-type tools as the machine tools to introduce the invention, it should be understood that "machine tools" can include cutting tools, grinding tools, lathes, abrasion tools (any removal of a substance through abrasion), planing tools, etc. The present invention can be applied to any type of rotational device machine tool that contacts or operates on a workpiece.

As discussed above, chatter is a regenerative instability associated with the playback of irregularities on workpiece 220 from previous cuts to cutting tool 410. Because this process requires the correlation between the resonance of machine tool assembly 400 and the played back irregularities, this process can be suppressed by continuously varying the stiffness of cutting tool 410 (or some component of or attached to machine tool assembly 400), and hence the resonant frequency of the machine tool assembly 400. The varying of resonant frequency of machine tool assembly 400 an be accomplished by modulating the stiffness of cutting tool 410, machine tool support 420, workpiece 210, workpiece support 205, or any other component of or in contact with the machine tool assembly 400. For convenience only, however, the discussion of the present invention will utilize cutting tool 410 as the subject to be modulated. The method of the present invention draws on the logic of the spindle speed variation approach described above in the Background of the Invention. In the present invention, instead of continuously changing the speed of the spindle assembly (i.e., machine tool support 420 and chuck 425), however, the present invention continuously changes the resonant frequency of machine tool assembly 400. Stiffness modulation of machine tool assembly 400 e.g., cutting tool 410 (i.e., modulating the mechanical impedance of cutting tool 410), can be accomplished by any means having variable compliance, including but not limited to, the class generally known as "smart" materials (ones whose flow or deformation compliance can be changed very rapidly), such as electro-rheological fluids, magneto-rheological fluids, shape memory alloys, metals or composites containing shape memory alloys (the metal or composite having an elastic modulus that changes with phase, which is influenced by several factors including temperature), piezo electric crystals to make or break mechanical contact depending on actuation, or actuators that modulate the extension and contact of systems of springs or other elastic structures.

Figure 5:
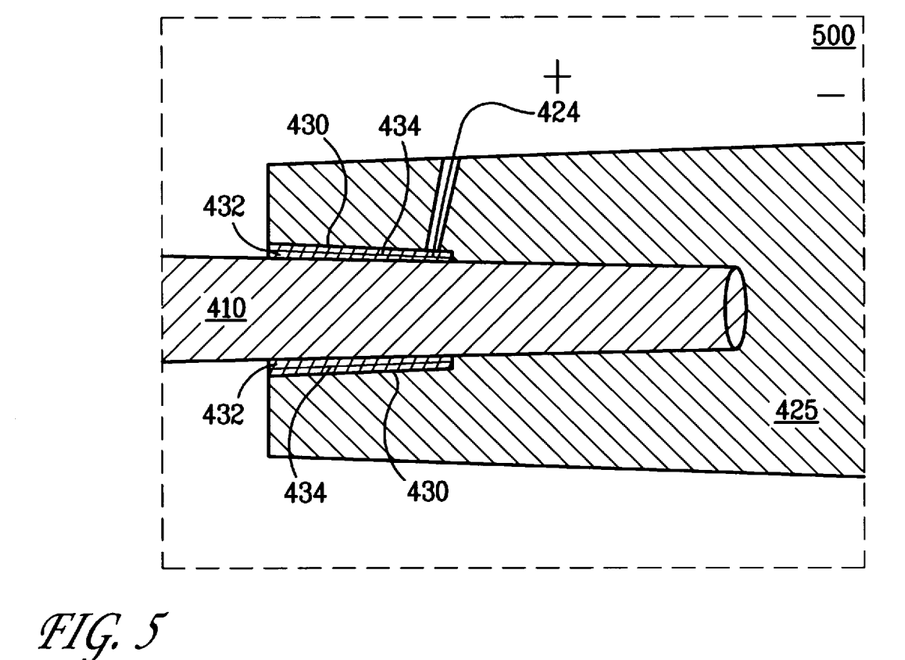
FIG. 5 is an exploded view of a portion of the embodiment illustrated in FIG. 4 in accordance with the present invention.

One embodiment for modulated impedance (time-varying impedance) of machine tool assembly 400 which exploits the modulated flow properties of electro-rheological fluids, is shown in FIG. 4. The machine tool support 420 is mechanically connected to a milling machine 490. In FIG. 4, cutting tool and machine tool support 420 are coupled; cutting tool 410 is received by machine tool support 420. A magnified view (500 in FIG. 5) (interface region in dotted-line box) of an annulus 430 formed between cutting tool 410 and machine tool chuck 425 is shown in FIG. 5. By way of example only, chuck 425 is fabricated by extending a standard/conventional chuck 425, as is often done to increase the stiffness of cutting tool 410 (See K. Z. Y. Yen and W. C. Hsueh, "A Study of Regenerative Chatter Vibration in Turning Workpiece," Second International Conference on Motion and Vibration Control, Yokohama, pp. 259–264, 1994.). However, a difference in the present invention is that the extended domain of chuck 425 is bored out to create annulus 430 between cutting tool 410 and machine tool chuck 425. In the configuration shown in FIGS. 4 and 5, annulus 430 is filled with electro-rheological fluid 434 and a perforated frustrumal shell electrode 432. The electrodes 432 are charged through slip rings 422 on the outside of tool support 420 to create an electric field (electrical contact is effected by contact 424 and slip rings 422). Altering the electrical field applied to the fluid induces a change in the variable compliance of the fluid, and thus the natural frequencies of the system. A cyclic variation of the field causes a side to side shift of the stability lobes as the process parameters are held constant.

Figure 5A:
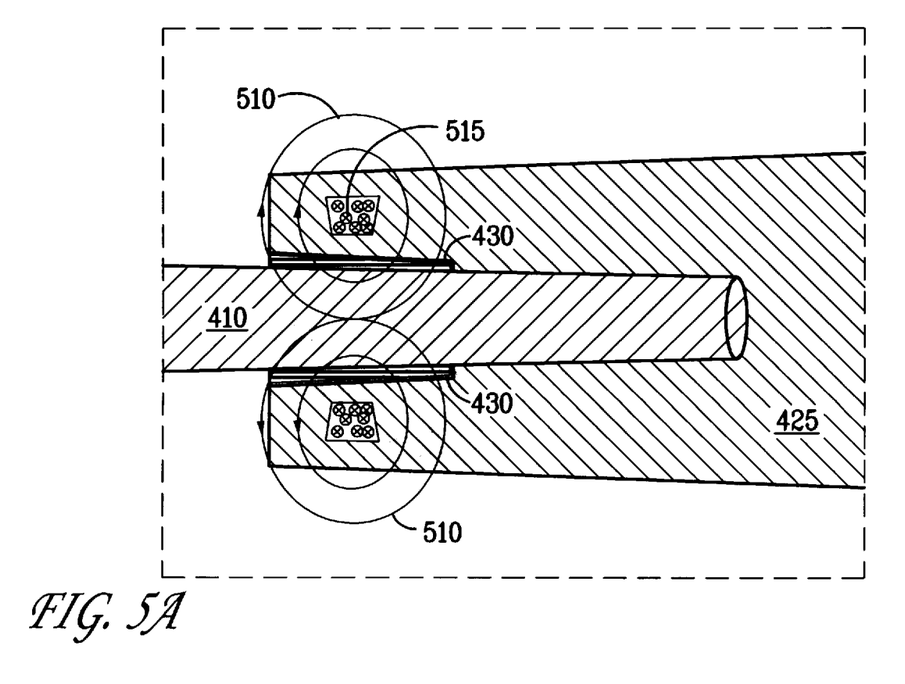
FIG. 5A is an exploded view of a portion of an alternate embodiment (magneto-rheological fluid versus electro-rheological fluid as in FIG. 5) in accordance with the present invention.
Figure 6:
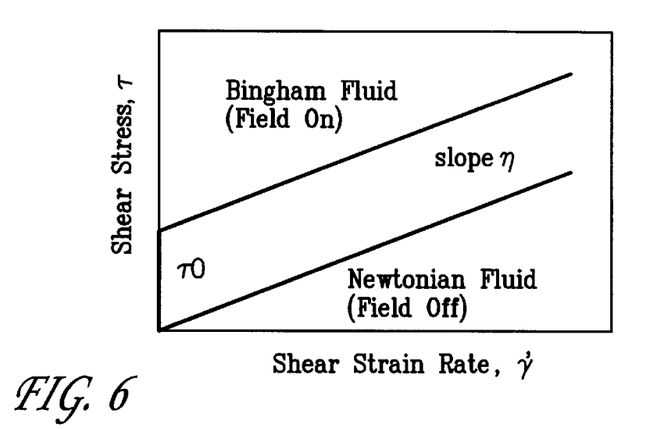
FIG. 6 is a graph of the Bingham fluid and the Newtonian fluid with shear stress $\tau$ and shear strain rate $\dot{\gamma}$.

To understand the significance of the present invention, one must examine some of the properties of electro-rheological fluids. These are fluids that are mildly shear thinning, viscous materials in the absence of an electrical field, but behave similarly to a Bingham fluid in the presence of electric fields. In the presence of an electric field, these materials appear to have a yield stress before flow and an elevated viscosity during flow. In the analysis performed for the present invention, the electro-rheological fluid—27% zeolite in silicon oil—is approximated as a Bingham fluid having a distinct yield stress ($\tau_0$) and a perfectly Newtonian viscosity ($\eta$) in the presence of an electric field as shown in FIG. 6. FIG. 6 is a graph of the Bingham fluid and the Newtonian fluid with shear stress $\tau$ versus shear strain rate $\dot\gamma$. The difference between the viscosities in the presence and the absence of electric field is ignored. Magneto-rheological fluids behave in much the same manner in response to applied magnetic fields and can be used in the present invention. Referring to FIG. 5A, an alternate embodiment is shown in which magneto-rheological fluid is used instead of electro-rheological fluid as in FIG. 5 and configured accordingly (e.g., electrodes are not necessary for the alternate embodiment). The general principles regarding the chuck 425 design are applicable in this alternate embodiment. A magnetic field 510 is created by charging wires 515 that circumferentially surround the cutting tool 410 to change the compliance of the fluid, and thus the frequencies of the system.

Referring to FIGS. 4 and 5, charging slip rings 422 creates an electric field through electro-rheological fluid 434, increases the flow resistance through annulus 430, and enhances both mechanical energy dissipation and mechanical coupling between machine tool support 420 chuck 425 and cutting tool 410. That increased coupling corresponds to an increased natural frequency to the system. The strategy proposed by the present invention is to modulate the electric field in annulus 430 between each cutting tool 410 passing. Thus, the oscillations recorded in the part by one tooth 220 passing are encountered by tool 410 with a different resonant frequency during the next tooth 220 passing.

Figure 7:
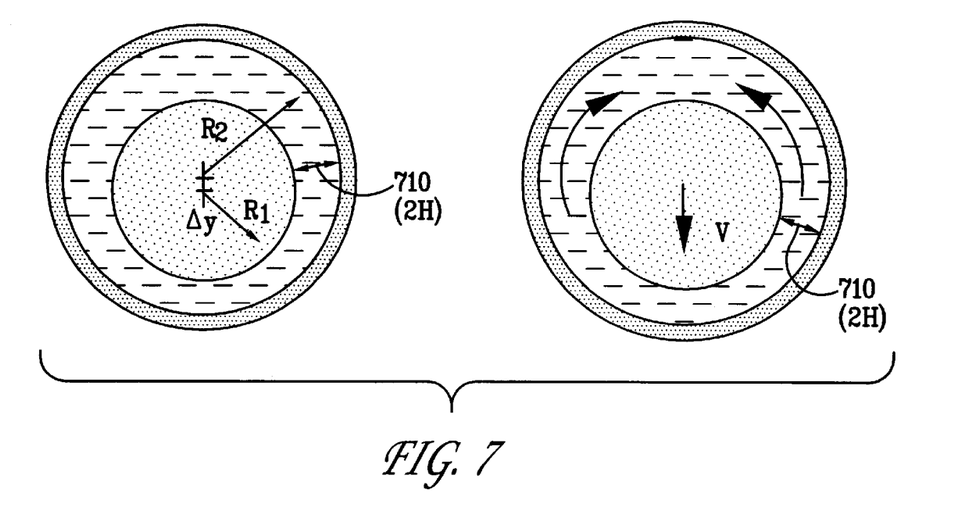
FIG. 7 is a sectional view of a cutting tool and cutting tool support (spindle) taken along view line 7—7 in FIG. 4.

The resultant system is modeled assuming that the length of annulus 430 is large compared to the radius of annulus 430 and that the radius of the annulus 430 is large compared to the gap dimension. Under those assumptions, the flow within annulus 430 resulting from the relative motion V between the cylinders can be assumed to be entirely in the circumferential directions (flow is volume conserving) and the lubrication approximation can be invoked. With the lubrication approximation, the flow-rate to pressure relationship is approximated by that of flow through a slit 710 (corresponding to gap width 2H in FIG. 8) as shown in FIG. 7. The relative displacement of the centers of the cylinders is Δy as shown in FIG. 7. The relative velocity of the two cylinders V determines the flow rate Q per unit depth through each cross section through conservation of volume according to Eq. (1).

$$Q(\theta) = -VR\sin(\theta). \quad\quad\quad \text{Eq. (1)}$$

Figure 8:
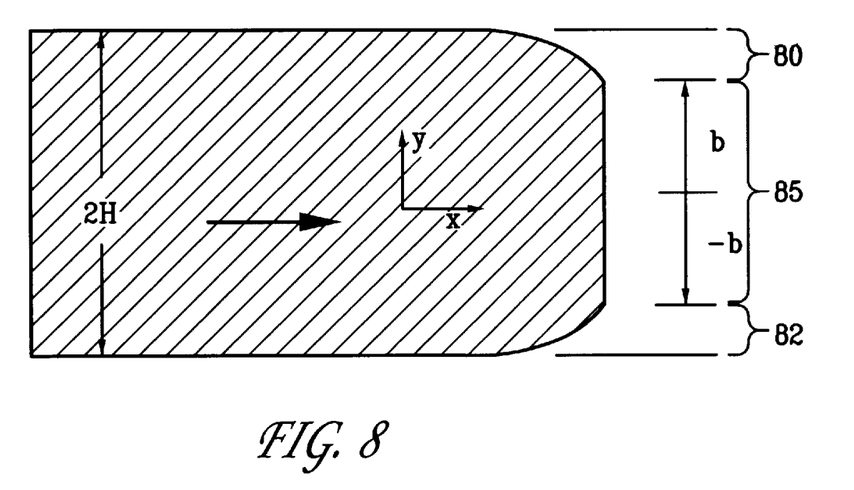
FIG. 8 is a diagram of the shear flow and plug flow regions within a slit.

Flow of a Bingham fluid through a slit involves two shear flow domains, 80 and 82, and a plug flow domain 85 as shown in FIG. 8. The solution of the flow rate/pressure relationship for such problems requires identification of the two shear flow 80 and 82 domains and plug flow domain 85 within the slit, which is accomplished with the aid of the following Eq. (2) (See R. B. Bird, R. C. Armstrong, and O. Hassager, *Dynamics of Polymer Liquids, VI*, John Wiley and Sons, p. 229, 1987.):

$$\beta^3 - 3\beta^2 Q^*\beta + 2Q^* = 0, \quad\quad\quad \text{Eq. (2)}$$

where $Q^* = Q/Q_0$, $$Q_0 = \frac{2}{3}H^3\left(\frac{\tau_0}{\eta H}\right), \beta = 1 - \frac{b}{H}.$$

2H is the slit thickness as shown in FIG. 8 (2H=(R$_2$−R$_1$)+Δy cos θ), and 2b is the thickness of the plug flow region 85 as shown in FIG. 8. Once the flow domains are determined, the pressure gradient ∇p is found from:

$$Q = \frac{2}{3}H^3\left(\frac{-\nabla p}{\eta}\right)\frac{\beta^2}{2}(3-\beta). \quad \text{Eq. (3)}$$

Figure 9:
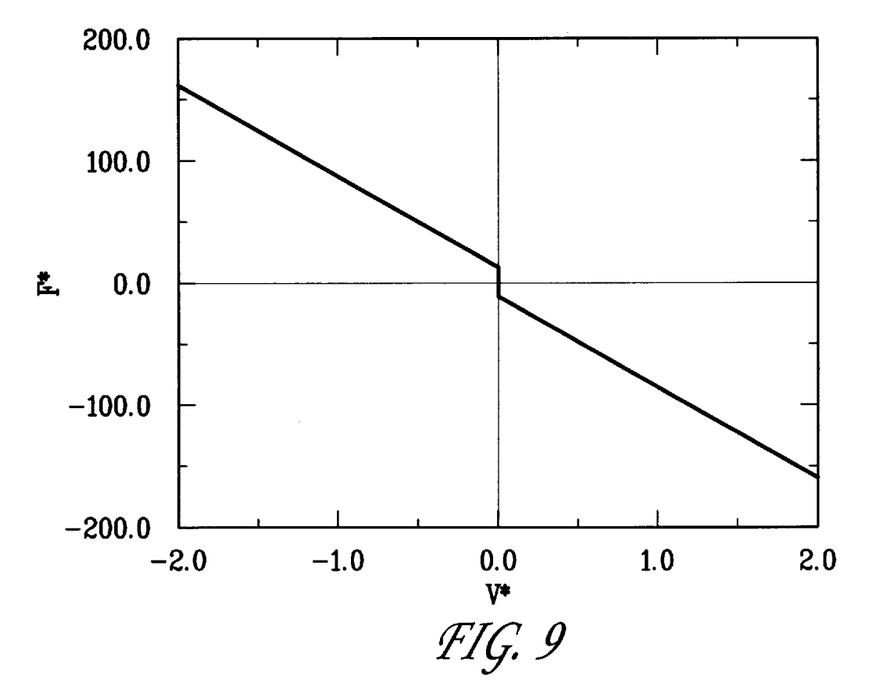
FIG. 9 is a graph of dimensionless force versus dimensionless lateral relative velocity of an inner cylinder with respect to an outer cylinder.

Having the pressure gradient around the annulus as a function of relative velocity, V, one integrates to find the pressure and integrates the vertical component of traction to obtain the net force, F, between the two cylinders. One integrates non-dimensional pressures to achieve non-dimensional force-velocity plots as shown in FIG. 9. This is all performed numerically, summarized in FIG. 9 which shows a chart of dimensionless force, $$F^* = \left(\frac{F}{\tau_0 R}\right)\left(\frac{2H}{R}\right),$$

versus dimensionless relative velocity $$V^* = \frac{V\eta}{(2H)\tau_0}\left(\frac{R}{2H}\right).$$

For the purpose of our analysis, we approximate the above curve of FIG. 9 by Eq. (4):

$$F^* = mV^* + b\, sgn(V^*),$$

where m=−75.36 and b=−11.9. For the Newtonian fluid we set b=0.

Determination of Fluid Forces on Cutting Tool 410

For simplicity, the machine tool support 420 is assumed rigid (single mode of deformation) in the following calculations (employing Lagrange analysis). We also consider a single cantilevered deformation mode of the tool in each of the lateral directions. Letting the axial spatial coordinate be z and the lateral spatial coordinates be x and y, the velocity of cutting tool 410 is:

$$V(z,t) = \phi_x(z)\dot{q}_x(t)\mathbf{i} + \phi_y(z)\dot{q}_y(t)\mathbf{j}, \quad \text{Eq. (5)}$$

where i and j are unit vectors along the x and y axes as defined in FIG. 2. We assume symmetry of cutting tool 410 so that:

$$\phi_x(z) = \phi_y(z) = \phi(z) \quad \text{Eq. (6)}$$

The magnitude of the velocity along cutting tool 410 is given by Eq. (7):

$$|V(z,t)| = \dot{q}(t)\phi(z) \quad \text{Eq. (7)}$$

in which $$\dot{q}(t) = (\dot{q}_x^2(t) + \dot{q}_y^2(t))^{1/2} \quad \text{Eq. (8)}$$

Substituting these kinematics into the non-dimensional force given in Eq. (4), we have an expression for the magnitude of force per unit length of cutting tool 410:

$$f(z,t) = \left(\frac{R}{2H}\right)^3 m\eta\phi(z)\dot{q}(t) + \left(\frac{R^2}{2H}\right)\tau_0 b\, sgn\dot{q}(t), \quad \text{Eq. (9)}$$

where any flow along the axial direction has been neglected. The vector force per unit length acts opposite the instantaneous velocity with the x and y components given by Eq. (10).

$$f_x(z,t) = f(z,t)\frac{\dot{q}_x(t)}{\dot{q}(t)} \text{ and } f_y(z,t) = f(z,t)\frac{\dot{q}_y(t)}{\dot{q}(t)}. \quad \text{Eq. (10)}$$

In formulating the Lagrange equations for motion of cutting tool 410, we compute the generalized forces associated with the resisting force of the Bingham fluid by assuming that the spindle assembly, specifically chuck 425 envelopes the entire cutting tool 410 from the point of cantilevered attachment to the end of annulus 430 (end of chuck 425). Integrating over this effective tool length L yields the generalized forces according to Eq. (11):

$$Q_x = \int_0^L f_x(z,t)\phi(z)dz \text{ and } Q_y = \int_0^L f_y(z,t)\phi(z)dz. \quad \text{Eq. (11)}$$

In our calculations, we use the first vibrational mode shape for a circular cantilevered Euler-Bernouli beam, given by Eq. (12):

$$\phi(z) = \quad \text{Eq. (12)}$$

$$\frac{1}{\sqrt{\rho\pi R_1^2 L}}\left[\cos\gamma z - \cosh\gamma z + \frac{\sinh\gamma - \sin\gamma L}{\cos\gamma L + \cosh\gamma L}(\sin\gamma z - \sinh\gamma z)\right]$$

in which ρ is the bar mass density and γ=1.875 is the first solution to the characteristic Eq. (13):

$$\cos\gamma L \cos h\, \gamma L = -1. \quad \text{Eq (13)}.$$

Simulated Milling Enhancements

The particular values and configurations discussed in this non-limiting example can be varied and are cited merely to illustrate an embodiment of the present invention and are not intended to limit the scope of the invention. In the following example of this embodiment, a computer simulation of the present invention demonstrated the features of the present invention.

Incorporating the generalized forces $Q_x$ and $Q_y$ as well as the cutting and inertial forces into the governing equations for the Euler Bernoulli beam, we solve for the generalized degrees of freedom $q_x(t)$, and $q_y(t)$. The cutting forces are assumed to be proportional to the instantaneous depth of cut, which is influenced by current and previous vibrations. (See S. Smith and J. Tlusty, "An Overview of Modeling and Simulation of the Milling Process," *Journal of Engineering for Industry*, Vol. 113, pp. 169–175, May 1991). The corresponding metal removal is recorded and exploited as a boundary condition in subsequent tool passes.

The above formulation was implemented in a computer code and used to simulate a slotting cut made with the paradigm system defined in the following Table 1 (Cutting tool 410 System Parameters) (see also FIG. 7):

TABLE 1

Cutting tool 410 System Parameters

| | |
|---|---|
| Tool Metal | Steel |
| Length, L | 12 in |
| Inner Bar Radius, $R_1$ | 1 in |
| Gap Size, $R_2$-$R_1$ | 1 mm |
| Number of Flutes | 4 |
| Part Metal | Aluminum |
| Electro-Rheological Fluid | 27% Zeolite in Silicon Oil |
| Viscosity, $\eta$ | 0.1 Pa-s |
| Yield Stress at 0 V, $\tau_0$ | 0 Pa |
| Yield Stress at 2.5 kV, $\tau_0$ | 500 Pa |
| Revolution Speed | 375 rpm |
| Depth of Cut | 4 mm |
| Chip Loading | 0.3 mm/tooth |

(For a discussion of Zeolite properties as electro-rheological Fluid, see A. Kollias and A. D. Dimarogonas, "Properties of Zeolite- and Cornstarch-Based electro-rheological Fluids at High Shear Strain Rates", *Advances in Intelligent material Systems and Structures, V2: Advances in Electro-rheological Fluids*, edited by Melvin A. Kohudic, Technomic Publishing Co., pp. 86–93, 1994.)

Figure 10:
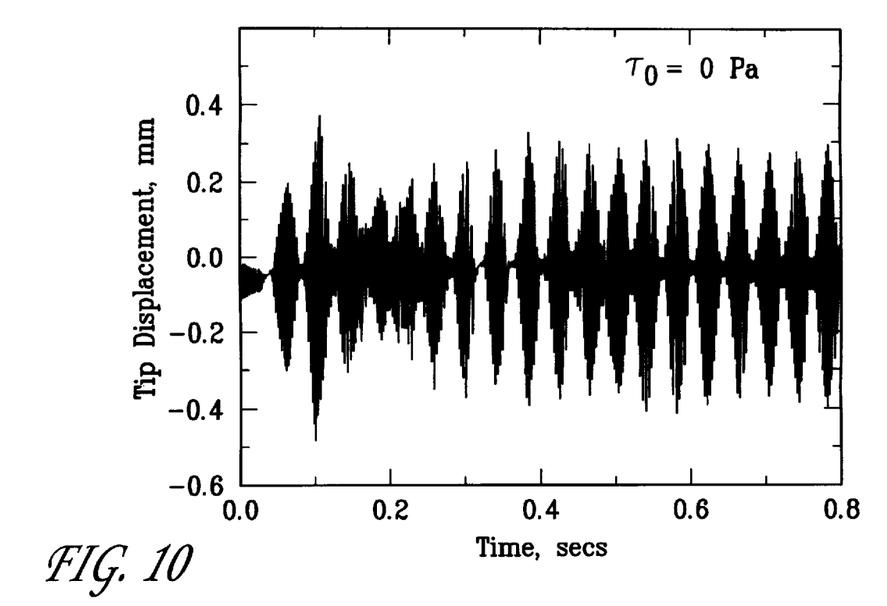
FIG. 10 is a cutting tool vibration history graph of the normal displacement (mm) of the tool as a function of time (secs) for the case of no applied electric field, which exhibits large amplitude chatter.

The first case considered is that in which no electric field is imposed. The compliance of cutting tool 410 is fairly large and a characteristic chatter response (according to the parameters of Table 1) evolves as illustrated in FIG. 10. The normal displacement (in the feed direction) of the tool tip shows maximum displacements on the order of 0.4-mm. The static component of cutting tool 410 deflection is due to a steady state normal force pushing cutting tool 410 against workpiece 210.

Figure 11:
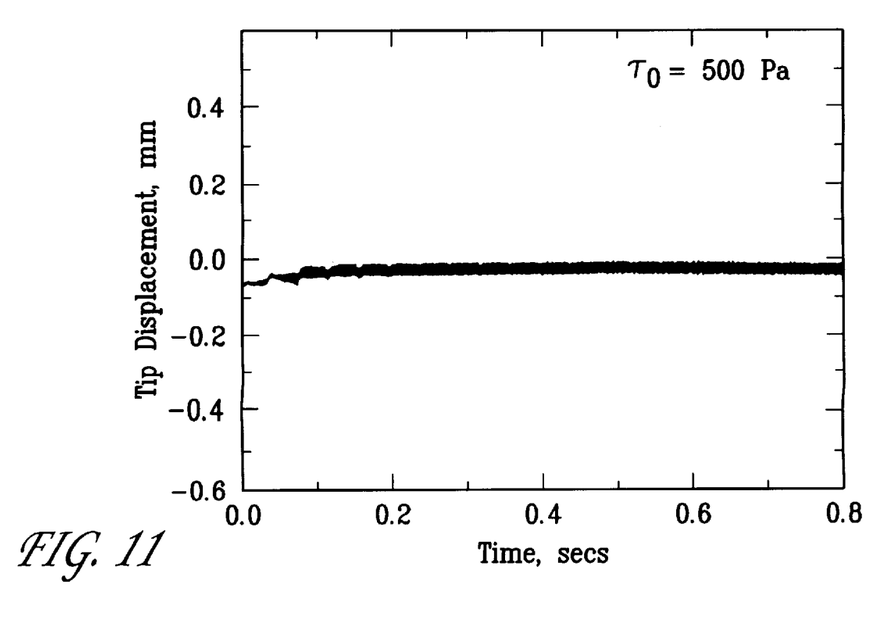
FIG. 11 is a cutting tool vibration history graph of the normal displacement (mm) of the cutting tool as a function of time (secs) for the case of a steadily-applied electric field, which exhibits lower amplitude chatter.

The next case considered is that of the imposition of a steady state electric field of 2.5-kV. The vibration amplitude decreases as the mechanical impedance of the cutting system is increased as shown in FIG. 11 (according to the parameters of Table 1). However, this reduced level of vibration is still caused by regenerative chatter.

Figure 12:
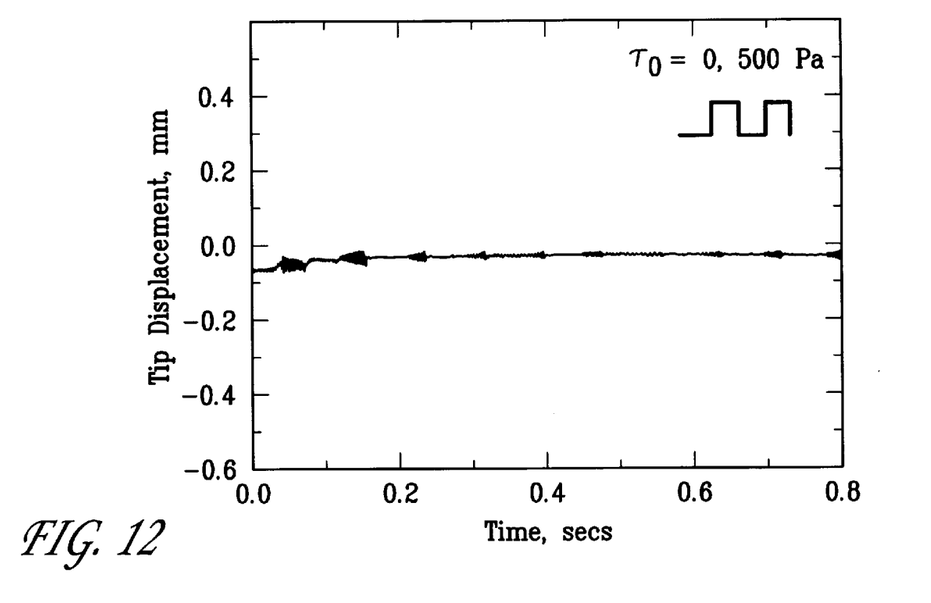
FIG. 12 is a cutting tool vibration history graph of the normal displacement (mm) of the cutting tool as a function of time (secs) for the case of an applied electric field turned on for every-other cutting tool passing, which exhibits even lower amplitude chatter.

The next case considered is that of a modulated electric field and the resulting modulated impedance of cutting tool 410, which is particularly interesting. In this case, the mechanical impedance is changed as a step function for each tool passing by alternating the electric field applied to fluid 434 between 0 and 2.5 kV. As shown in FIG. 12 (according to the parameters of Table 1), the amplitude of chatter is significantly reduced, though there does seem to be a visible inception of oscillation each time the field is turned off. It is important to note that the resultant tip displacement is visibly less than that of the case of the continuously-stiff structure.

Figure 13:
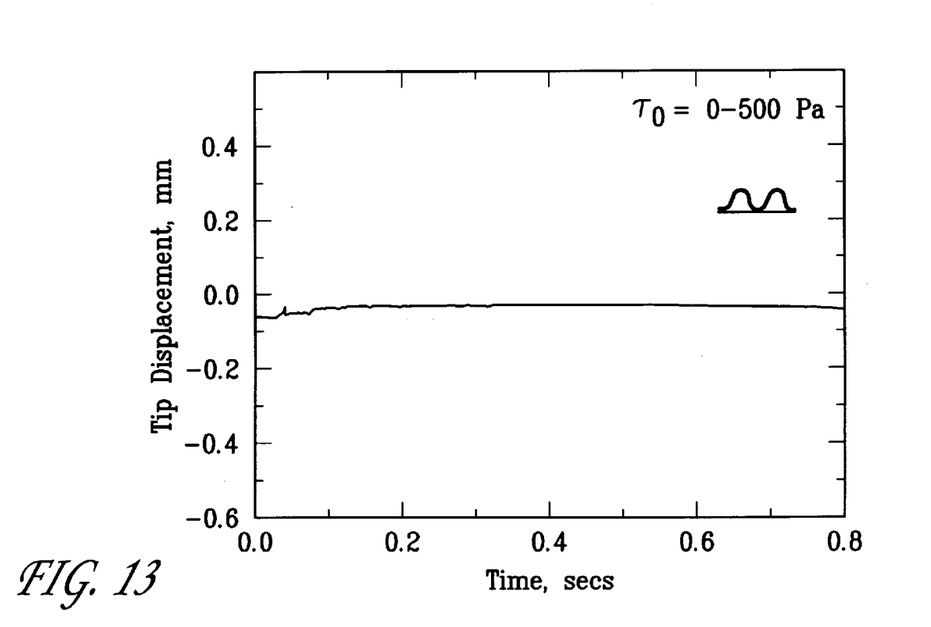
FIG. 13 is a cutting tool vibration history graph of the normal displacement (mm) of the cutting tool as a function of time (secs) for the case of an oscillating applied electric field, which exhibits very little amplitude chatter (almost entirely suppressed).

The next case considered is that of an electric field applied sinusoidally so that it achieves its maximum of 2.5-kV on every-other tool passing and hits zero at the center of the remaining tool passings. Because the tool frequency changes throughout each tooth 220 pass, the waviness imposed on the workpiece 210 as a result of tool vibrations is more random in nature. Consequently, the regeneration of waviness is entirely suppressed and the chatter vibration for this case have been eliminated as shown in FIG. 13 (according to the parameters of Table 1).

In summary, the present invention presents a strategy for mitigating regenerative chatter vibrations in machine tool assemblies. The method of the present invention is based on altering the modal characteristics of cutting tool 410 to disrupt the regeneration of waviness on the surface of workpiece 210. An exemplary embodiment of the variable-impedance machine tool was presented using an electro-rheological fluid to influence the coupling of the tool to the sleeve. The viability of the present invention was demonstrated using computer simulations of a milling process with a variable-impedance machine tool. Results indicate that significant reductions in chatter vibrations can be achieved by varying the electric field applied to the fluid during each pass of a tooth of cutting tool 410. Although a step variance in the electric field proved moderately successful at reducing chatter vibrations, best results were obtained through a sinusoidally-varying field with a the half-period of oscillation equal to the time interval between cutting passes. Success was demonstrated using only modest changes in the mechanical impedance of tool 410 which can be achieved using commercially-available technology.

Other variations and modifications of the present invention will be apparent to those of skill in the art, and it is the intent of the appended claims that such variations and modifications be covered. For example, it is contemplated that hardware implementation of the present invention could involve a magneto-rheological fluid (as shown in FIG. 5A) instead of the electro-rheological fluid discussed herein. The particular values and discussed above can be varied and are cited merely to illustrate a particular embodiment of the present invention and are not intended to limit the scope of the invention. It is contemplated that the use of the present invention can involve components having different characteristics as long as the principle, the presentation of a method and apparatus for suppressing vibration in machine tools by modulating impedance, is followed. It is intended that the scope of the present invention be defined by the claims appended hereto.

We claim:

1. A method for controlling chatter in a machine tool assembly during a machining operation, the machine tool assembly having a plurality of components, the plurality of components comprising a variable compliant component made with a material having a variable compliance, the plurality of components having a mechanical impedance, the method comprising the step of modulating the mechanical impedance of at least one of the plurality of components, wherein the machine tool assembly further comprises a chuck, the chuck in mechanical communication with the variable compliant component, wherein the step of modulating the mechanical impedance comprises modulating the resonant frequency of the plurality of components by changing the variable compliance of the variable compliant component to mitigate regenerative chatter vibrations.

2. The method of claim 1, wherein the at least one of the plurality of components is a cutting tool.

3. The method of claim 2, wherein the at least one of the plurality of components is a machine tool support adapted to receive the cutting tool.

4. The method of claim 3, wherein the at least one of the plurality of components is a workpiece to be operated on by the cutting tool.

5. The method of claim 3, wherein the step of modulating the mechanical impedance further comprises the step of using piezo electric materials and making intermittent contact with the machine tool support.

6. The method of claim 1, wherein the mechanical impedance is time varying.

7. A method for controlling chatter in a machine tool assembly during a machining operation, the machine tool assembly having a plurality of components, the plurality of components having a mechanical impedance, the method comprising the step of modulating the mechanical impedance of at least one of the plurality of components to mitigate regenerative chatter vibrations, wherein the step of modulating the mechanical impedance further comprises the step of using a chuck and means for modulating the resonant frequency of the plurality of components, the means having a variable compliance.

8. The method of claim 7, wherein the means is an electro-rheological fluid.

9. The method of claim 7, wherein the means is a magneto-rheological fluid.

10. The method of claim 7, wherein the means is a metal containing a shape memory alloy, the metal having an elastic modulus that changes with phase.

11. The method of claim 10, wherein the step of modulating the mechanical impedance further comprises the step of modulating the elastic modulus of the metal.

12. The method of claim 7, wherein the chuck has an annulus adapted to receive a material having a variable compliance.

13. The method of claim 7, wherein the at least one of the plurality of components comprises a cutting tool, and wherein at least one of the plurality of components is a machine tool support adapted to receive the cutting tool, wherein the step of modulating the mechanical impedance further comprises the step of providing a signal to the cutting tool, the signal having a square wave form.

14. The method of claim 7, wherein the at least one of the plurality of components comprises a cutting tool, and wherein at least one of the plurality of components is a machine tool support adapted to receive the cutting tool, wherein the step of modulating the mechanical impedance further comprises the step of subjecting the cutting tool to a field, the cutting tool having at least one blade, the field being characterized by a sinusoidal form.

15. The method of claim 7, wherein the at least one of the plurality of components comprises a cutting tool, and wherein the step of modulating the mechanical impedance further comprises the step of providing a random signal to the cutting tool.

16. A method for controlling chatter in a machine tool assembly during a machining operation, the machine tool assembly having a plurality of components, the plurality of components having a mechanical impedance, the method comprising the step of modulating the mechanical impedance of at least one of the plurality of components, wherein the step of modulating the mechanical impedance further comprises modulating the resonant frequency of the plurality of components to mitigate regenerative chatter vibrations, wherein the at least one of the plurality of components comprises a cutting tool, and wherein at least one of the plurality of components is a machine tool support adapted to receive the cutting tool, wherein the step of modulating the mechanical impedance further comprises the step of providing a signal to the cutting tool, the signal having a square wave form.

17. A method for controlling chatter in a machine tool assembly during a machining operation, the machine tool assembly having a plurality of components, the plurality of components having a mechanical impedance, the method comprising the step of modulating the mechanical impedance of at least one of the plurality of components, wherein the step of modulating the mechanical impedance further comprises modulating the resonant frequency of the plurality of components to mitigate regenerative chatter vibrations, wherein the at least one of the plurality of components comprises a cutting tool, and wherein at least one of the plurality of components is a machine tool support adapted to receive the cutting tool, wherein the step of modulating the mechanical impedance further comprises the step of subjecting the cutting tool to a field, the cutting tool having at least one blade, the field being characterized by a sinusoidal form.

18. A method for controlling chatter in a machine tool assembly during a machining operation, the machine tool assembly having a plurality of components, the plurality of components having a mechanical impedance, the method comprising the step of modulating the mechanical impedance of at least one of the plurality of components, wherein the step of modulating the mechanical impedance further comprises modulating the resonant frequency of the plurality of components to mitigate regenerative chatter vibrations, wherein the at least one of the plurality of components comprises a cutting tool, wherein the step of modulating the mechanical impedance further comprises the step of providing a random signal to the cutting tool.

* * * * *